United States Patent
Rubalsky et al.

(10) Patent No.: US 7,543,495 B2
(45) Date of Patent: Jun. 9, 2009

(54) MEASURING RESERVOIR

(76) Inventors: Sergey Dmitrievich Rubalsky, ul. Pobedy, #4-72, St. Petersburg (RU) 196070; Dmitry Vadimovich Aleshkin, Nab. Robespiera 6-123, St. Petersburg (RU) 190000

( * ) Notice: Subject to any disclaimer, the term of this patent is extended or adjusted under 35 U.S.C. 154(b) by 429 days.

(21) Appl. No.: 11/609,498

(22) Filed: Dec. 12, 2006

(65) Prior Publication Data
US 2007/0089507 A1 Apr. 26, 2007

Related U.S. Application Data

(63) Continuation of application No. PCT/IB2004/051662, filed on Sep. 1, 2004.

(30) Foreign Application Priority Data
Aug. 2, 2004 (RU) .............................. 2004123716

(51) Int. Cl.
*G01F 19/00* (2006.01)
(52) U.S. Cl. ....................................... 73/427
(58) Field of Classification Search ................... 74/427
See application file for complete search history.

(56) References Cited

U.S. PATENT DOCUMENTS 5,108,016 A * 4/1992 Waring ...................... 222/468
5,295,610 A * 3/1994 Levison ...................... 222/26
5,447,245 A   9/1995 Merhar et al.

FOREIGN PATENT DOCUMENTS

JP     09 108562 A    8/1997

* cited by examiner

*Primary Examiner*—Robert R Raevis
(74) *Attorney, Agent, or Firm*—Houston Eliseeva LLP

(57) ABSTRACT

A measuring reservoir for measuring the volume of the second component of a two-component mixture by the given volume of the first component and the given ratio of the mixture components is described. The reservoir has a housing of transparent material with measuring scales marked on the outside. The first scale is for the measurement of the volume of the first component, the second scale is a ratio scale on which there are marks corresponding to the ratio of the volumes of the components. One of the scales is stationary and marked on the outside of the housing, the other scale is movable along the stationary scale. A cursor is coupled to the movable scale in a cantilever manner. The cursor is shaped as a plank or rod oriented along the side surface of the housing on which a level curve of the second component is marked.

7 Claims, 5 Drawing Sheets

MEASURING RESERVOIR

RELATED APPLICATIONS

This application is a Continuation of PCT application serial number PCT/IB2004/051662 filed on 1 Sep. 2004, which claims priority to Russian application serial number 2004123716 filed on 2 Aug. 2004, both of which are incorporated herein by reference in their entirety.

FIELD OF THE INVENTION

The invention is in the field of measuring the volume of liquids and granular materials, especially in reference to measuring reservoirs.

BACKGROUND OF THE INVENTION

A variety of reservoirs is generally known: graduated cylinders, volumetric flasks, graduated beakers, etc. These are all made of transparent materials—glass or plastic. The side of the container is labeled with a scale, horizontal marks of which correspond to a given volume of liquid or dry granular materials.

The measuring cylinder for oil products, in accordance with standard 1770-74 of the Russian Federation, was chosen as a prototype. (See www.sama.ru for more information.) The measuring reservoir is made of transparent glass, and has a cylindrical shape, on which horizontal marks and numbers form a vertical measuring scale are marked, indicating what volume of liquid corresponds to a given mark. The measuring reservoir makes it possible to measure a necessary amount of liquid.

However, there exist situations in which it is necessary to mix liquids in specific proportions. Such a situation occurs, for example, during the making of a flammable mix of gasoline and motor oil, used in internal combustion engines. At the same time, it is necessary to make mixtures of different proportions for different engines. The making of such mixtures calls for the measuring of the first component, the exact calculation of the amount of the second component, and the measuring of the second component. In this way, the use of ordinary measuring reservoirs causes problems with the making of a two component mixture.

The object of this invention is to simplify the dosing of the components in a two component mixture, for example, a liquid.

SUMMARY OF THE INVENTION

The problem is solved by a reservoir made of transparent material, the sides of which are marked with a scale. The novelty of the invention is that the first scale is a scale for the measurement of the first component, and the second scale is a ratio scale, with marks corresponding to the ratio of the components of a two-component mixture. One of the aforementioned scales is stationary and is marked on the body of the reservoir itself, while the second scale is moveable, with the possibility to move it along the stationary scale. On the second, moveable scale, there is a cursor attached in a cantilever manner, made in the form of a plank or a bar, oriented along the outer side of the reservoir, on which a curve is marked, indicating the level of the second component. Both scales are logarithmic.

It is preferable to make a housing as a cylinder with its side surface in the form of a rotational body. The volumetric scale of the first component can be marked on the surface of the housing and oriented on the plane, perpendicular to the vertical axis of the housing. At the same time, a ratio scale can be written on the ring, movably fixed on the housing, with the provision that it can be moved along the volume scale of the first component.

It is possible to mark the referential scale on the outside of the housing, in a plane perpendicular to the vertical axis of the housing. In this case, the volume scale of the first component is written on the ring, movably fixed on the housing, with the provision that it can be moved along the ratio scale.

It is preferable to give the housing a configuration, in which the inner cross-section is variable, and the lower part gets smaller as it approaches the bottom.

The level curve of the second component can have markings corresponding to the volume of the second component.

On the top of the glass an additional scale with markings, corresponding to the volume of the second component, determinable by the level curve, can be written.

A more detailed description of the invention can be found in the implementation examples provided below and illustrated by the following Figures.

BRIEF DESCRIPTION OF THE DRAWING FIGURES.

FIG. 1 is a front view of a reservoir in the form of a parallelepiped with horizontally ruled scales.

FIG. 2 a front view of a reservoir with vertically ruled scales.

FIG. 3 a front view of a reservoir with circular scales.

DETAILED DESCRIPTION OF THE INVENTION

The reservoir of the present invention can be used for the determination of the volume of the second component of a two-component mixture, by the given amount of the first component and the given ratio of the mixture components.

Figure 1:
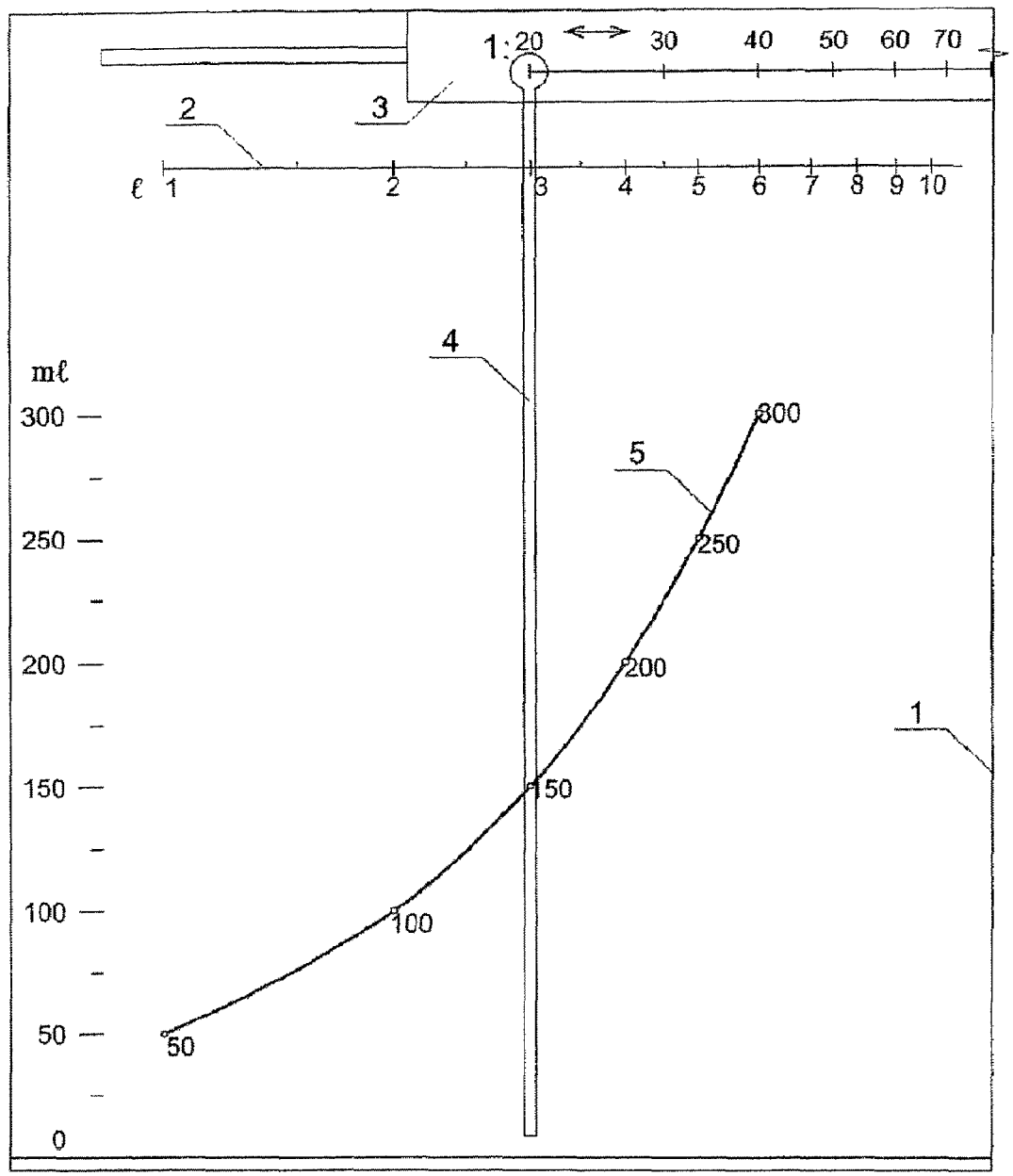

Turning now to FIG. 1, the reservoir has a housing 1 made of transparent material—glass or plastic. The housing can have any acceptable form, such as a vertically oriented parallelepiped. A preferable form of the housing is that of a glass, the outside of which is in the shape of a rotational body, for example, a cone. Most preferable is the form of a cylindrical glass, or close to cylindrical.

On the outside of the housing is marked a measuring scale, made for the calculation of the volume of the first component, for example, gasoline. Specifically a scale of volume (liters, fractions of a liter) for which the volume of the second component, for example, motor oil, is determined. This scale can be completed in the form of marks or lines, next to which are written corresponding numerical values of the volume of the first component. In the case of the housing 1 being in the form of a parallelepiped (FIG. 1), scale 2 of the volume of the first component can be oriented horizontally, for example, along the top edge of the housing. The other scale 3 is a ratio scale, and on it are written markings, corresponding with the volume of components in a two-component mixture, for example, 1:20, 1:30 . . . 1:100, i.e. the fraction of the second component in reference to the first. The number of markings on scale 3 can be reduced to the minimum amount necessary.

A possible variation of this is when a legend characteristic of the ratios of the components of a two-component mixture is written next to the lines or marks, not the numerical values. Scale 3 is a disc with markings, and is coupled to the housing in such a way that it can be moved along the scale 2. For this, there can be directional protrusions on the outside surface of the housing, and corresponding grooves on the movable scale, or vice versa—directional grooves on the housing and protrusions on the scale.

The inverse positioning of the scale is possible as well—a ratio scale marked on the outside of the housing with a movable volumetric scale of the first component.

Cursor 4—the indicator of the level of the second component—is attached to the movable scale in a cantilever manner and positioned perpendicular to the scale. Cursor 4 can be a lengthened plate made out of transparent material with a longitudinal line, or it can also be a rod or a tube oriented along the outer surface of the housing. The cursor can serve as a marker on the scale.

On the outside of the housing level curve 5 of the second component is marked. Curve 5 is in the shape of an arc and rises monotonously from left to right without extremums and points of inflection. It can be determined by calculation or experimentally. Its configuration depends on the shape and size of the housing. In a horizontal layout of the scales, it is preferable to have the cursor 4 be oriented vertically. In the case when the scales are placed along the upper side, the cursor is oriented downwards; when along the lower side, the cursor is oriented upwards. Its length is such, that it reaches both ends of curve 5.

Figure 2:
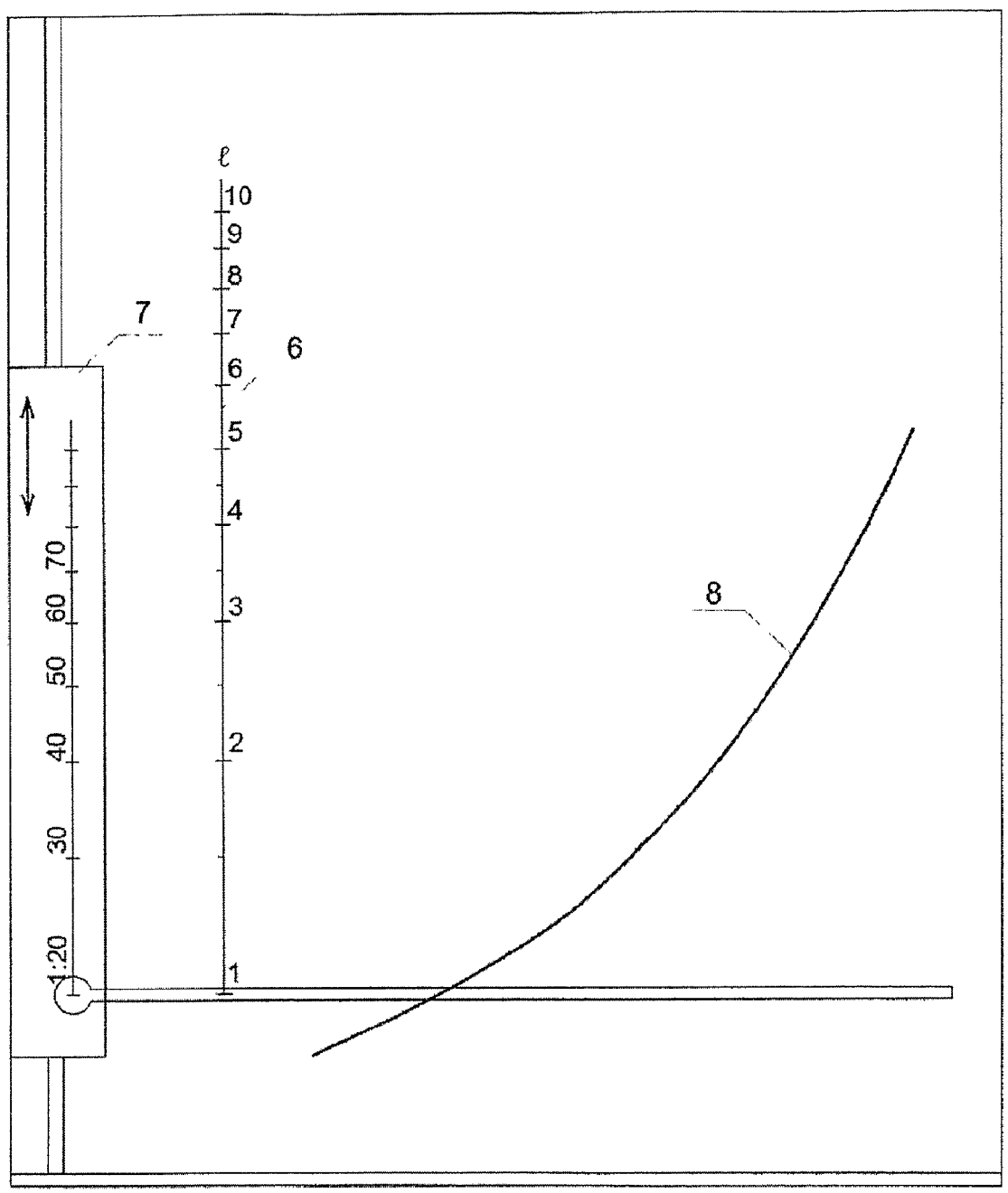

The scales can be oriented vertically as well (FIG. 2). In this case, one of the scales, for example, scale 6, is a scale for measuring the volume of the first component, while scale 7 is a ratio scale. One of the scales is coupled movably relative to the other one, so that one can be moved along the other. In the case of such an orientation of scales, level curve 8 of the second component has a configuration similar to the above-described, and cursor 9 is oriented horizontally.

Figure 3:
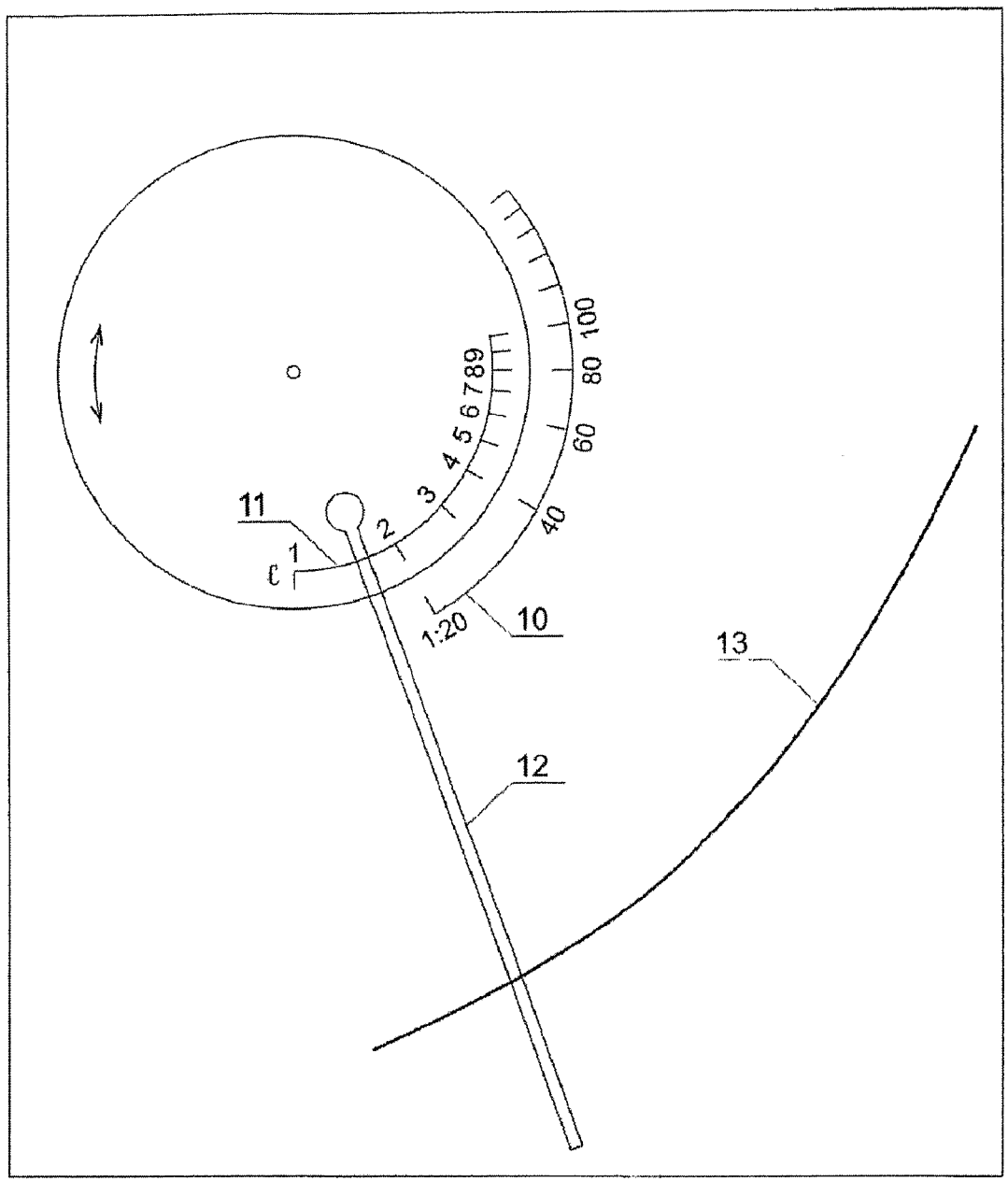

In the case of the housing having flat boundaries, the scales can be made circular axial (FIG. 3). In this case, one of the scales, for example, scale 10, is a scale for the measuring of the volume of the first component, while the other scale, scale 11, is a scale of ratio. One of the scales, the inner or the outer, is written on a disc or ring fastened on the housing, with the provision of it's rotation around it's axis, the other—written directly on the housing. The scales need not be full circles, but can be parts—sectors. The cursor 12 is radially positioned on the moving scale, and oriented towards the side of the level curve 13 of the second component.

All of the aforementioned scales are logarithmic.

Figure 4:
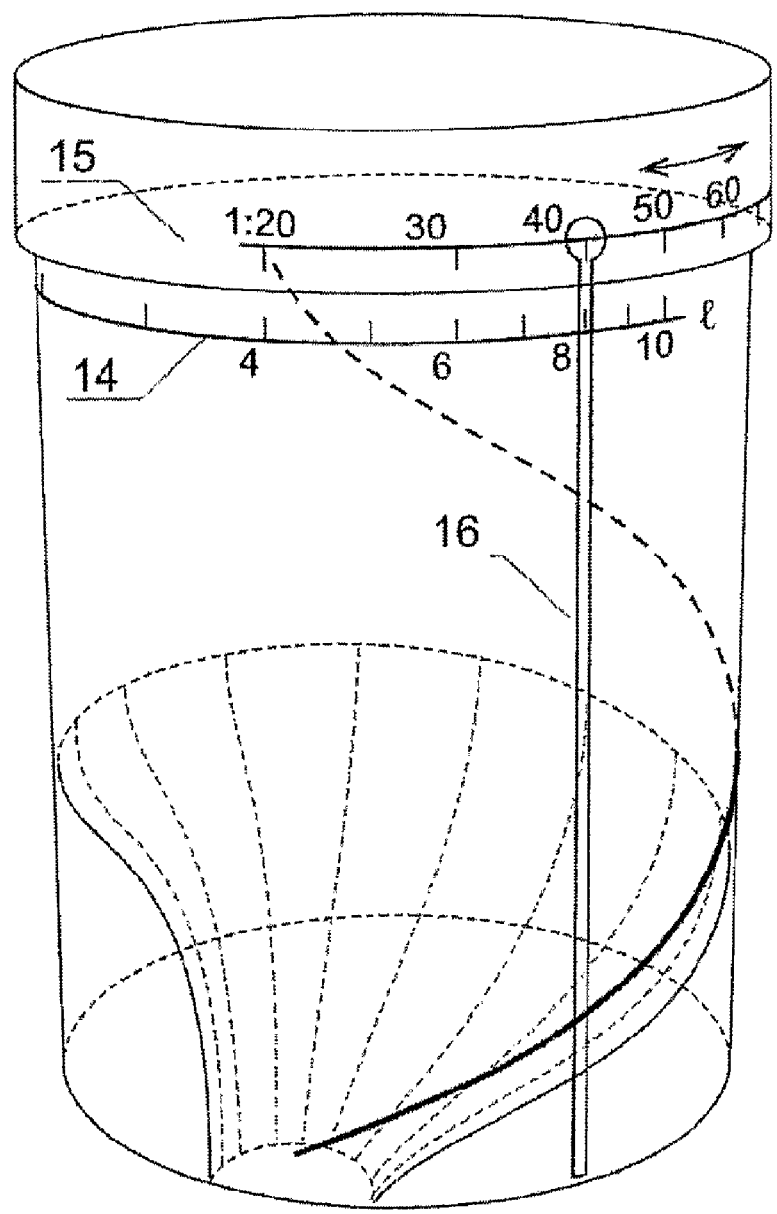
FIG. 4 is a general view of a reservoir in the form of a cylindrical glass.

The most preferable form for the housing is a cylindrical glass (FIG. 4), or glass whose form is close to cylindrical. The scales can be placed on the lower part, the upper part, or in the middle of the housing.

In the case of the scales being located in the upper portion of the housing, one of them, for example, scale 14, is a scale for the measuring of the volume of the first component, and is marked along the upper part. The second scale 15, the scale of ratios, is marked on the ring and coupled likewise on the upper edge of the housing. The ring can be moved along the scale 14. The inverse positioning is also possible—the ratio scale can be marked directly on the housing along its edge, and the scale for measuring the volume of the first component—on the moving ring. In this case, cursor 16 is coupled on the moving ring and is oriented downwards.

Figure 5:
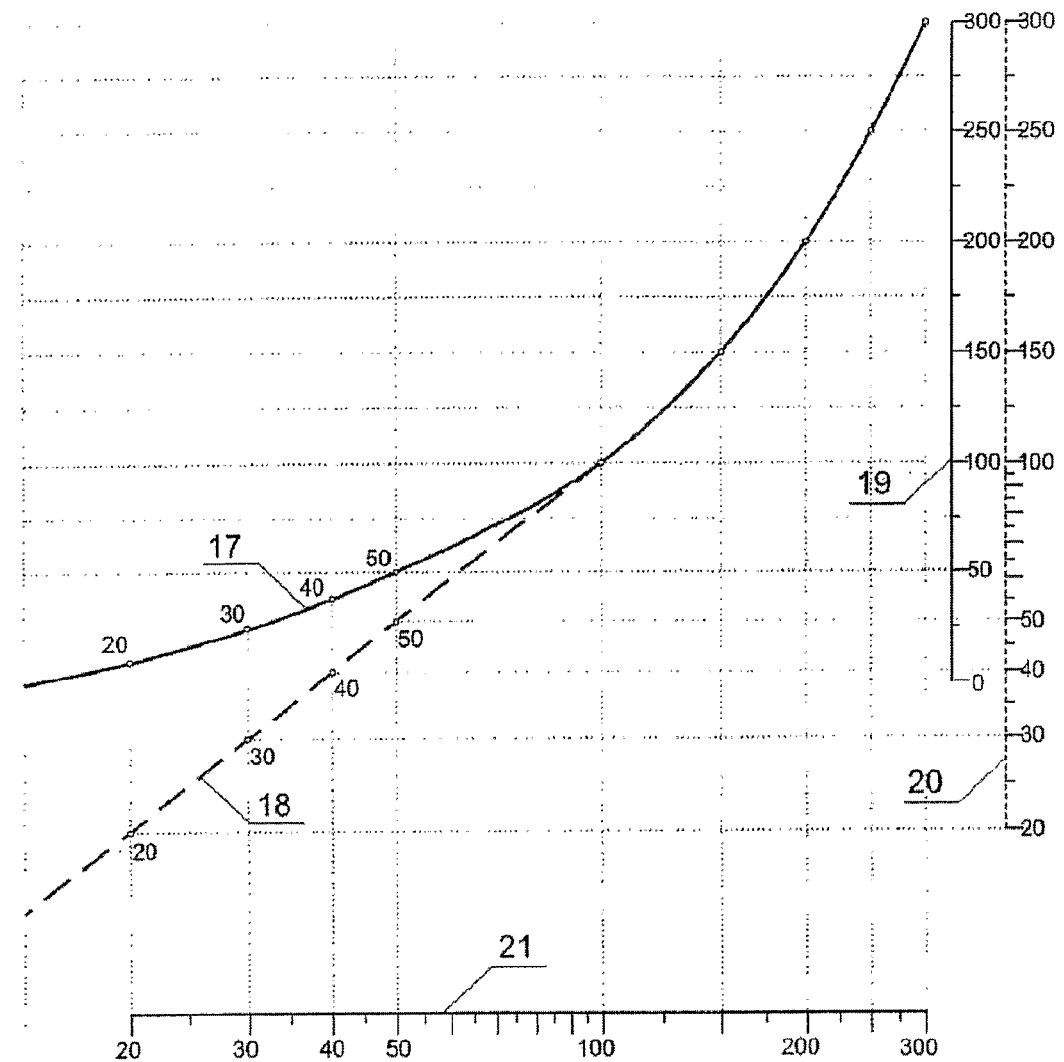
FIG. 5 are the graphs of the level of the second component.

In the case of a constant vertical cross section of the inner volume of the reservoir, the level curve of the second component is tilted at a slight angle in its lower portion, asymptotically approaching the horizontal axis, which lessens the accuracy and inconveniences the measurement of small volumes (FIG. 5). This drawback can be overcome by changing the shape of the lower internal volume of the reservoir. To raise the slope of the lower part of the curve 17, the internal volumepart tapers downwardly. At the same time, the outside can remain cylindrical, or also taper towards the bottom. The curve for a downwardly tapering reservoir is shown by dotted line 18. A similar result can be achieved with the help of an insert, changing the configuration of the lower portion of the reservoir. The level curves of the second component may have markings, corresponding to the actual volume of the second component. The actual volume of the second component can be determined using additional scales 19, 20, 21 on which the values of the volume of the second component are projected from the level curve of the second component. Curve 17 corresponds to scale 19, curve 18 to scale 20, and scale 21 corresponds to both curves 17, and 18.

Using these scales it is possible to perform the reverse measurement—the calculation of the volume of the first component with the known volume of the second component and the ratio of the components, as well as the calculation of the ratio of the components with the known volumes of the first and second component.

The measuring reservoir is used in the following manner. First, the desired volume of the first component of a two-component mixture is chosen according to the scale of the first component. Then the mark of the second scale, which determines the ratio of the components, is set against the chosen value. To achieve this, depending on which scale is movable, it is moved in relation to the stationary one. Furthermore, at the point of intersection of the cursor and the level curve of the second component, the amount of the second component is measured by filling the reservoir to that level. In the case of the level curve of the second component having marks corresponding with the actual volume of the second component, the actual volume is determined by these marks when needed. In the case of the reservoir containing additional scale 19, then the point of intersection of the cursor and the level curve of the second component is projected onto this scale, also determining the actual volume of the second component.

Thus, in order to measure the amount of the second component in a two-component mixture to the given volume of the first component at the given ratio of the components, it is not necessary engage in proportions or calculations. The invention can be applicable to the measuring of the volume of liquids, as well as granulated materials.

It should be noted that the outside of the housing of the reservoir can be marked with an ordinary vertically oriented scale, so that it is possible to measure substances in the traditional manner.

The invention claimed is:

1. A measuring reservoir comprising:
   a transparent housing having a side surface with a curve corresponding to a level of a second component in a two-component mixture;
   a first logarithmic scale for measuring the amount of a first component, and a second logarithmic ratio scale having the marks corresponding to a ratio of the first and the second components in a two-component mixture, wherein one of the scales is marked on the side surface of the reservoir and is stationary, the other scale is moveable along the stationary one; and
   a cursor coupled to the other scale in a cantilever manner and oriented along the side surface with the curve.

2. The measuring reservoir of claim 1, wherein the housing is a glass and the side surface is a rotation body, wherein the first logarithmic scale is marked on the side surface and is oriented on the plane perpendicular to the vertical axis of the housing, and wherein the ratio scale is moveable along the first scale, the ratio scale is marked on a ring which is moveably coupled to the housing.

3. The measuring reservoir of claim 1, wherein the housing is a glass and the side surface is a rotation body, wherein the ratio scale is marked on the side surface and is oriented on the plane perpendicular to the vertical axis of the housing, and wherein the first scale is moveable along the ratio scale, the first scale is marked on a ring which is moveably coupled to the housing.

4. The measuring reservoir of claim 2, wherein the housing is configured to have a variable internal cross-section which tapers downwardly.

5. The measuring reservoir of claim 3, wherein the housing is configured to have a variable internal cross-section which tapers downwardly.

6. The measuring reservoir of claim 1, wherein the curve corresponding to the level of the second component has marks corresponding to the volume of the second component.

7. The measuring reservoir of claim 1, wherein the side surface comprises an additional scale with marks corresponding to the volume of the second component determined with the level curve.

* * * * *